Oct. 23, 1934.   C. O. COZZENS   1,977,822
OPHTHALMIC MOUNTING
Filed Oct. 22, 1932
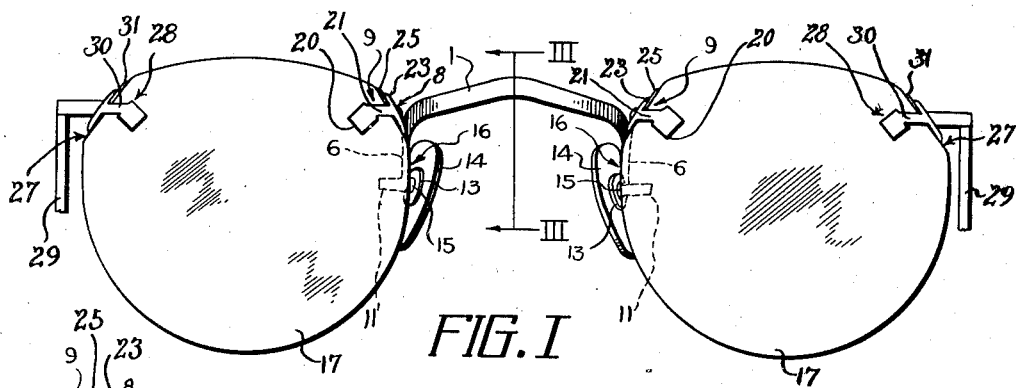
FIG. I
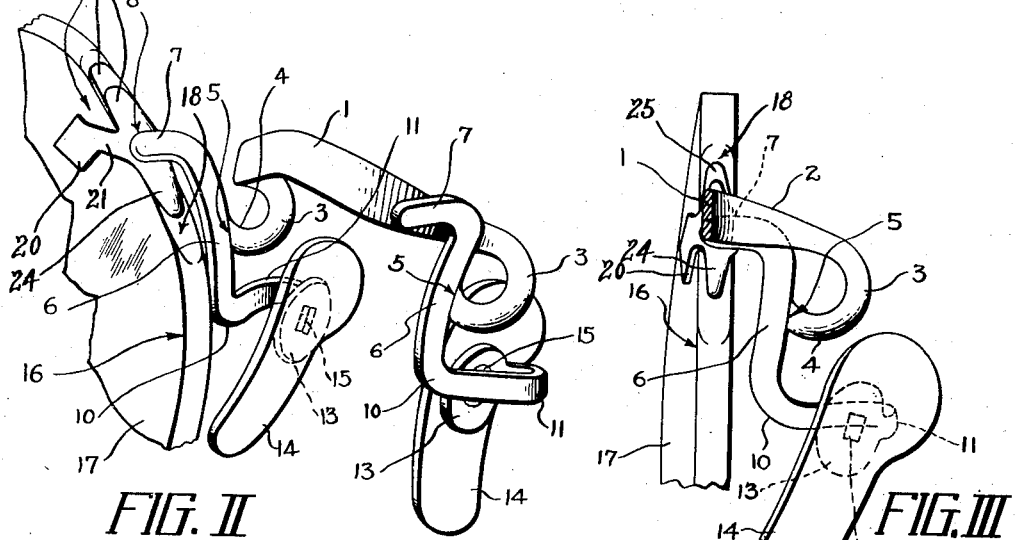
FIG. II
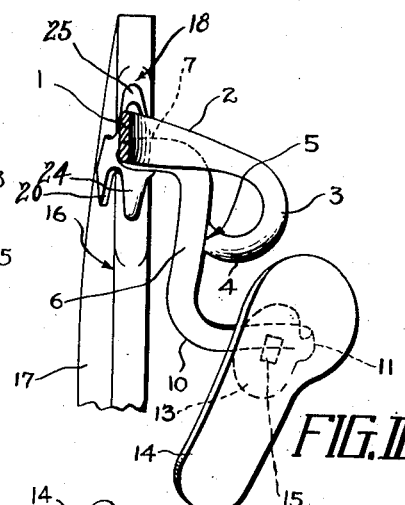
FIG. III
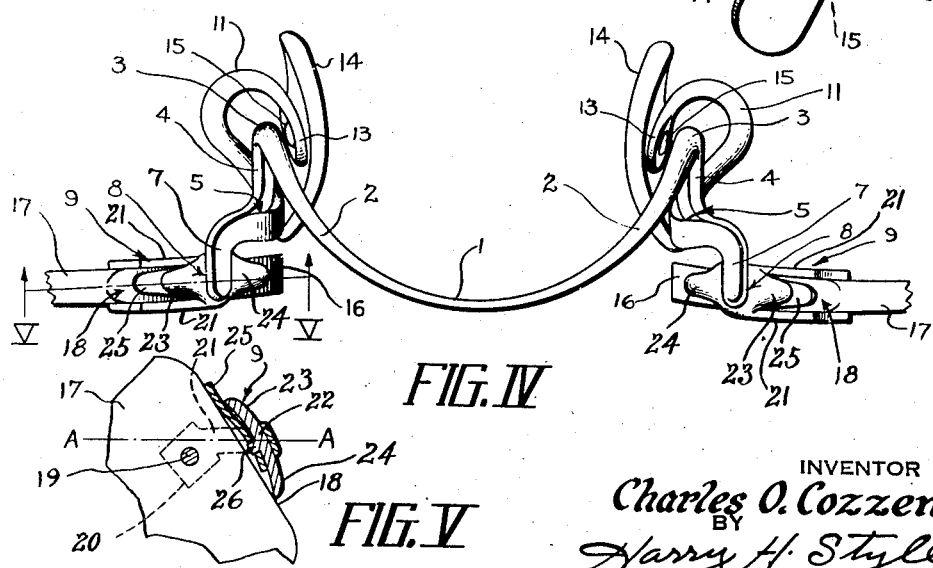
FIG. IV
FIG. V
INVENTOR
Charles O. Cozzens.
BY
Harry H. Styll
ATTORNEY Patented Oct. 23, 1934

1,977,822

UNITED STATES PATENT OFFICE 1,977,822

OPHTHALMIC MOUNTING

Charles O. Cozzens, Southbridge, Mass., assignor to American Optical Company, Southbridge, Mass., a voluntary association of Massachusetts Application October 22, 1932, Serial No. 639,070

5 Claims. (Cl. 88—45)

This invention relates to improvements in means for supporting ophthalmic lenses or the like before the eyes of the wearer and to an improved method of arranging and assembling said supporting means.

One of the principal objects of the invention is to provide an ophthalmic mounting having its lens holding means positioned in horizontal streamline relation with each other above the useful field of vision in combination with an improved bridge member having adjustable means for positioning and supporting the said mounting in desired relation with the eyes of the wearer and arranged with the lenses in such a manner that the said adjustable means are substantially invisible and inconspicuous when on the face of the wearer.

Another object of the invention is to provide an improved bridge member having supporting and attaching means for attachment to the lenses above the useful field of vision and adjustable lens, guard and arch supporting portions which may be adjusted independently of each other to the facial requirements of the wearer.

Another object is to provide improved means and method of arranging and fitting the mounting to the wearer so that the various adjustable elements of the supporting bridge member will be substantially invisible and inconspicuous when in assembled relation with the lenses and in position of use on the face of the wearer.

Another object is to provide improved means and method of attaching and fitting the lens supporting means to the lenses and of easing off the rigidity of the connections to said lenses.

Other objects and advantages will become apparent from the following description taken in connection with the accompanying drawing, and it will be apparent that changes and modifications in the arrangement and construction of the parts and methods shown and described may be made without departing from the spirit of the invention as expressed in the accompanying claims. I, therefore, do not wish to be limited to the exact details of construction, arrangements of parts and methods shown and described as the preferred forms only have been shown by way of illustration.

Referring to the drawing:

Fig. I is a front view of an ophthalmic mounting embodying the invention;

Fig. II is a partial perspective view of Fig. I;

Fig. III is a sectional view taken on line III—III of Fig. I;

Fig. IV is an enlarged fragmentary plan view of Fig. I; and

Fig. V is a sectional view taken on line V—V of Fig. IV.

Much difficulty has been encountered in the past in providing a suitable bridge member for an ophthalmic mounting having its lens holding means or straps fitted and attached to the lenses above the useful field of vision. The main difficulty has been in providing suitable adjustable supporting means for the various parts of the bridge member and of attaching the said bridge member to the lens holding means or straps so that the adjustable parts thereof may be fitted to the facial requirements of the wearer and yet be positioned where they will be substantially invisible and inconspicuous when in use.

It therefore is one of the primary objects of the invention to provide a bridge member having suitable separately adjustable supporting means and an improved method of adjusting the said means to the facial requirements of the wearer and for simultaneously locating them at a position wherein they will be substantially invisible and inconspicuous when in use.

Referring more particularly to the drawing wherein similar reference characters designate corresponding parts throughout, the device embodying the invention comprises a relatively thin and resilient central arch portion 1 having outwardly tapering and rearwardly extending end portions 2 terminating in relatively rigid downwardly extending adjustable loop portions 3. The said loop portions 3 lie substantially in a vertical plane and turn forwardly at 4 for attachment at 5 to vertically extending adjustable supports 6. The supports 6 are provided adjacent their tops with forwardly extending portions 7 attached at 8 to the lens holding means 9. The said supports 6 are bent rearwardly at 10 from the vertical plane and are looped forwardly at 11 in the horizontal plane and in a direction inwardly of the ends of the arch 1 to produce forwardly extending terminal nose guard attaching means 13 to which the guards 14 are pivotally attached at 15.

The supports 6 are shaped to lie directly adjacent the nasal sides and in the rear of the peripheral edges 16 of the lenses 17 of the mounting and are adapted to be shielded from view by said edges when the mounting is observed from in front. It is apparent that the relation between the supporting portions 6 and the edges 16 of the lenses might be changed slightly in some instances during the adjustment of the mounting to the facial requirements of the wearer and in view of this the various elements are provided with relatively long adjustments so that one skilled in the art may obtain the desired adjustments and simultaneously position the supports 6 in desired relation with the edges 16 of the lenses. The said supports 6 also provide long depending means to which the loop portions 3 of the bridge may be secured at varying positions longitudinally thereof to vary the height of the arch portion 1 relative to the tops of the lenses. Slight adjustments in this direction and in a direction transversely thereto may be made by adjustment of the said loop portions 3. The lower loop portions 11 are for the purpose of adjusting the nose guards 14 in any desired direction independently of the arch 1, loop portions 3 or portions 6. Attention is directed to the fact that the loop portions 3 and 11 extend rearwardly of the plane of the lenses and are adapted to fit in close relation with the nose of the wearer. This causes the said loops to be substantially invisible when on the face of the wearer and provides relatively long adjustable elements for positioning the parts in desired relation with the face.

The lens holding means 9 are attached to a specially formed seat 18 on the lenses 17 by attaching means 19 such as a screw, solder or other means positioned in an opening formed in the lens adjacent the seat. The said attaching means is secured to spaced depending portions 20 on the holding means 9. The said depending portions 20 are formed on the ends of the portions 21 of a bifurcated support and extend below the longitudinal axes A—A of said portions. The axes of said portions are adapted to lie on a line substantially parallel with the horizontal meridian of the lens and on an angle other than normal relative to the plane of the seat 18 on said lens. The base portion 22 of the bifurcated support is provided with peripheral engaging extensions 23 and 24 which lie in a plane substantially parallel with the plane of the seat 18 and intersect the longitudinal axes A—A of the portions 21 on an angle other than normal. A spring 25 is secured to the base 22 between the portions 21 by a projection 26. The said spring extends outwardly of the upper extension 23 and provides a resilient peripheral engaging member which is adapted to urge the lower extension 24 into engagement with the edge of the seat 18 during the use of the mounting. The tension of the spring 25 is controlled by adjusting the extension 23 toward and away from the edge of the lens. The position of the strap on the lens is varied by adjustment of the extension 24 relative to the edge of the lens. This permits the portions 21 to be moved about the connecting means 19 as a center and be placed in a plane substantially parallel with the horizontal axis of the lens to produce a streamline effect across said lens.

The lenses 17 adjacent their temporal sides are provided with a specially formed attaching seat 27 to which the lens holding means 28 is attached to provide a connection for each temple or side 29 of the mounting. The seat 27 lies on an angle other than normal relative to the longitudinal axis of the lens and is adapted to support the portions 30 of the holding means 28 in horizontal streamline relation with the portions 21 of the holding means 9. The lens holding means 28 is substantially identical in structure to that of the holding means 9. It is adjusted and fitted to the lens seat 27 in a similar manner and is provided with a spring member 31 for easing off the connection to the lens. Attention is directed to the fact that the relatively thin central arch portion 1 of the bridge member may be adapted to absorb shocks and strains on the lenses in a direction transversely to the planes of said lenses and that the resilient means 25 and 31 of the lens holding means 9 and 28 are adapted to absorb shocks and strains in the direction of the planes of the lenses. The said resilient means 25 and 31 also provide means for obviating looseness and play in the connections to the lenses.

The procedure of forming and fitting the mounting to the face of the wearer is as follows:

The fitting of lenses to their mountings, and adjusting these mountings to the facial requirements of the wearer is a very difficult, expert and important procedure in the dispensing of eyeglasses and spectacles to the wearer. This work is performed by highly trained and developed members of a profession that requires a technical education as well as experience which is recognized in many States by licensing laws. An eyeglass or spectacle lens if not properly positioned in its mounting, or if improperly mounted before the eye of the patient, may injure the eyesight instead of aiding the same. This is particularly true in the case of lenses having compound prescriptions, including prismatic, cylindrical or other compound combinations requiring true axial relation with the eyes.

In forming and fitting applicant's mounting each lens is first surfaced to the prescriptive requirements of the patient. Its optical axis and prescriptive elements are then located and laid out upon the lens. The shape of the lens is then carefully laid out in relation to the optical properties of the lens and at the same time a special shaped seat is provided for the mounting. The lens is then placed in a lens cutter and carefully cut to shape. It is then placed in an edging machine and carefully edged to shape. This locating and fixing of the lens seat is a very important procedure requiring expert skill and accuracy as the lens must be shaped about a predetermined center and the connecting zone thereon formed in such a position as to support the lens in accurate prescriptive relation with the eye. The lens holding means or strap is then fitted to the specially shaped zone and to the surfaces of the lens by bending the edge and surface engaging portions to the shapes required. The location of the connecting opening in the lens is then determined, marked and drilled at the desired distance from the edge of the seat.

The strap is again fitted to the connecting seat, and in the case of the screw connection to the lens is adjusted to obtain exact alignment of the strap connecting openings with the opening in the lens. The connecting screw is then inserted in the aligned openings and the strap checked for alignment of parts and tried to determine the tension relative to the edge of the lens. If the parts are not in proper relation the screw is removed, the final altering adjustments made, and the mounting then permanently secured in fixed relation with the lens.

In regulating the tension of the peripheral engaging spring members 25 and 31 in either case, care must be taken that the spring is so positioned that it is free to flex in either direction, that is, towards or away from the edge of the lens. This result is obtained by adjusting the portions 23 so that they bear adjacent their free ends against the springs. This causes the underlying portions of the springs to move to a spaced relation with the lens edge and with the inner surface of the portions 23, as illustrated in the drawing. This provides resilient means for absorbing shocks and strains and for eliminating looseness and play of the connecting means on the lens.

In all instances the finished mounting must be accurately fitted to the face of the wearer prior to its use. This fitting is very important and is one of the factors requiring great skill and technical training. Extreme care must be taken that the lenses are supported in accurate prescribed relation with the eyes, particularly lenses having prismatic or cylindrical corrections which require true axial relation with the eyes or lenses of the bifocal or trifocal type having different focal fields which must be placed in accurate relation with the eyes. These lenses are very expensive and great care must be taken that they are not broken during the forming or fitting of the mounting. In adjusting the mounting to the facial requirements of the wearer the lenses are first adjusted to a position wherein the distance between their centers are equal to the distance between the pupils of the eyes. This adjustment is accomplished by bending the upper portions of the depending members 6 and also by adjustment of the loop portions 3 sidewise. This adjustment in some instances will move the lower portions of the depending members 6 from their desired relation with the edges 16 of the lenses and thereby require alteration of said relation.
Care must be taken that this adjustment does not change the adjusted distance between the centers of the lenses. The nose guards are then adjusted to fit the wearer's nose and to support the centers of the lenses in aligned relation with the pupils of the eyes. This adjustment is accomplished by bending the loop portions 11 to raise or lower or adjust the guards in or out or sidewise. In forming this adjustment great care must be taken that the guards are positioned so that they support the centers of the lenses in line with straight ahead vision of the eyes and that the pressure thereof on the nose will not cause them to cut in the flesh and hurt the wearer. Attention is then directed to the arch portion 1 to determine its height and general relation with the nose. If it is at an improper height or if not in an accurate position in or out with respect to the nose the said loop portions 3 are bent up or down or in or out in a direction normal to the plane of the lenses to a position wherein the arch is located in desired relation with the nose. In forming this adjustment care is taken that it does not alter the adjusted distance between the centers of the lenses. It is to be understood that the fitting adjustments are made only after the lens holding means have been properly mounted and fitted to the lenses.

When the general fitting adjustments have been completed the various loops 3 and 11 and portions 6 are carefully observed when on the face of the wearer to determine if they are located at such a position as to be as inconspicuous as possible. Slight alterations necessary to accomplish this result are made and the mounting is then ready for use.

It is apparent that the various adjustable elements, when in the hands of a person skilled in the art, provide means whereby a wide range of adjustments may be accomplished and that a single mounting may be adjusted to the requirements of most individuals. This type of mounting requires only a small investment on the part of the dispenser as it obviates the necessity of having to keep on hand a large stock of different sizes as has been usual in the past. The mounting overcomes most of the difficulties of the prior art and is durable and inconspicuous in use. The resilient connections provide novel means of absorbing shocks and strains on the lenses and of obviating the usual looseness and play of the connecting means. The structure enables the lens holding means to be positioned in alignment with each other to produce a pleasing streamline effect across the lenses and the mounting in general is constructed to be ideal both from the standpoint of design and utility.

From the foregoing description it will be seen that I have provided simple, efficient and economical means and methods of obtaining all of the objects and advantages of the invention.

Having described my invention I claim:

1. An ophthalmic mounting comprising a pair of lenses each having a definitely formed attaching seat on the nasal side thereof and connected by a bridge member attached to lens holding means mounted on said seats, the said bridge member being comprised of a relatively resilient central arch portion having relatively rigid rearwardly curved portions which are looped substantially in the vertical plane and turned forwardly, a pair of support members secured intermediate their ends one to each of the forwardly extending portions of the loops and having a portion adjacent one of their ends extending forwardly and attached to the lens holding means and a portion adjacent their opposite ends extending rearwardly to a loop which turns forwardly substantially in the horizontal plane and terminates in nose guard attaching means, the said support members being adapted to lie behind the peripheral edges of the lenses on the nasal sides thereof when in use.

2. An ophthalmic mounting comprising means for holding a pair of lenses, said means connected by a bridge member having a central arch portion having rearwardly curved portions which are looped substantially in the vertical plane and turned forwardly, a pair of support members associated intermediate their ends one with each forward terminus of the forwardly extending portions of the loops and having a portion adjacent one of their ends extending forwardly and associated with a lens holding means and a portion adjacent their opposite ends extending rearwardly to a loop which turns forwardly substantially in the horizontal plane and terminates in nose guard attaching means, the said support member being adapted to lie behind the peripheral edges of the lenses on the nasal sides thereof, by bending the support members to said positions.

3. An ophthalmic mounting comprising means for holding a pair of lenses, said means connected by a bridge member having a central arch portion with rearwardly curved portions which are looped substantially in the vertical plane and turned forwardly, a pair of support members associated intermediate their ends with each forward terminus of the forwardly extending portions of the loops, the portion above said loop extending upwardly above said loop and associated with a lens holding means, and the portion below said loop extending downwardly below said loop and rearwardly to a loop which turns forwardly substantially in the horizontal plane and terminates in a nose guard attaching means, and a nose guard secured to said nose guard attaching means.

4. An ophthalmic mounting comprising means for holding a pair of lenses, said means having a portion for fitting over the edge of the lens and a portion for fitting over the face of the lens and a leaf spring member held on the lens side of the edge portion, one end of said spring projecting beyond an end of the edge portion and the other end located internally of an end of the edge portion, said lens holding means connected by a bridge member having a central arch portion having rearwardly curved portions which are looped substantially in the vertical plane and turned forwardly, a pair of support members associated intermediate their ends, one with each forward terminus of the forwardly extending portions of the loops and having a portion adjacent one of their ends associated with a lens holding means and a portion adjacent their opposite ends extending rearwardly to a loop which turns forwardly substantially in the horizontal plane and terminating in nose guard attaching means, and a nose guard secured to each of said nose guard attaching means.

5. An ophthalmic mounting comprising means for holding a pair of lenses, said means connected by a bridge member having a central arch portion having rearwardly curved portions which are looped and turned forwardly, main supporting portions extending upwardly and downwardly with respect to each of the forwardly extending portions of the loops, said upwardly extending portions having a portion adjacent their upper ends extending forwardly and associated with a lens holding means and said downwardly extending portions having a portion adjacent their lower ends extending rearwardly to a loop which turns forwardly and terminates in a nose guard supporting portion, the said main supporting portions being adapted to lie behind the perpheral edges of the lenses on the nasal sides thereof by bending the said main supporting portions to said positions.

CHARLES O. COZZENS.